United States Patent [19] [11] 4,242,410
König et al. [45] Dec. 30, 1980

[54] PROCESS FOR THE PRODUCTION OF FOAM PLASTICS BASED ON POLYISOCYANATES HAVING A LIGHT AND YELLOWING RESISTANT TOP LAYER AND RESULTANT PRODUCT

[75] Inventors: Eberhard König, Kronberg; Manfred Schönfelder, Leverkusen; Josef Pedain, Cologne, all of Fed. Rep. of Germany

[73] Assignee: Bayer Aktiengesellschaft, Leverkusen, Fed. Rep. of Germany

[21] Appl. No.: 10,567

[22] Filed: Feb. 9, 1979

[30] Foreign Application Priority Data

Feb. 14, 1978 [DE] Fed. Rep. of Germany ....... 2806215

[51] Int. Cl.$^3$ ..................... B32B 5/18; B29D 27/04
[52] U.S. Cl. ................... 428/315; 264/46.6; 264/255; 264/267; 428/320; 528/64
[58] Field of Search ............. 264/46.6, 46.9, 255, 264/267; 428/315, 320; 528/64

[56] References Cited

U.S. PATENT DOCUMENTS

| | | | |
|---|---|---|---|
| 2,908,943 | 10/1959 | Miller | 264/46.6 |
| 3,420,800 | 1/1969 | Haggis . | |
| 3,475,266 | 10/1969 | Strassel | 528/64 X |
| 3,487,134 | 12/1969 | Burr | 264/46.6 |
| 3,726,952 | 4/1973 | Boden et al. . | |
| 3,752,695 | 8/1973 | Finelli . | |
| 3,773,875 | 11/1973 | Lammers | 264/46.6 X |
| 3,824,199 | 7/1974 | Nadeau et al. . | |
| 3,845,183 | 10/1974 | Harrison | 264/46.6 |
| 3,847,720 | 11/1974 | Laberinti . | |
| 3,873,407 | 3/1975 | Kumata et al. | 264/46.6 X |
| 4,020,001 | 4/1977 | White | 521/167 X |
| 4,024,090 | 5/1977 | Von Bonin et al. | 521/110 |
| 4,033,912 | 7/1977 | Kleimann et al. | 521/111 |
| 4,058,492 | 11/1977 | Von Bonin et al. | 521/99 X |
| 4,116,893 | 9/1978 | Flanagan | 264/46.6 X |

*Primary Examiner*—Philip Anderson
*Attorney, Agent, or Firm*—Gene Harsh; Joseph C. Gil; R. Brent Olson

[57] ABSTRACT

The instant invention is directed to a process for the production of molded polyisocyanate-based foam products having a compact, light- and yellowing-resistant polyurethane-based top layer comprising the steps of:
  A. coating a mold with a liquid polyurethane-polyurea-based coating agent, containing a binder, which reacts to form a light- and yellowing-resistant top layer and
  B. introducing a foamable reaction mixture into said mold,
wherein said binder comprises:
  (i) at least one isocyanate prepolymer having at least two exclusively aliphatically and/or cycloaliphatically bound isocyanate groups and
  (ii) a hardener mixture composed of water and primary polyamines, at least partly in aldimine- or ketimine-blocked form, which have aliphatically and/or cycloaliphatically bound amino groups.

13 Claims, No Drawings

PROCESS FOR THE PRODUCTION OF FOAM PLASTICS BASED ON POLYISOCYANATES HAVING A LIGHT AND YELLOWING RESISTANT TOP LAYER AND RESULTANT PRODUCT

BACKGROUND OF THE INVENTION

This invention relates to a new process for the production of foam plastics based on polyisocyanates which have a top layer which is resistant to light and yellowing. A completely satisfactory commercial process for producing polyisocyanate foam plastics with a top layer which is resistant to light and yellowing has not, to date, been attained.

The principle which has been practiced for many years of producing such articles by a two-stage process in which a foam core is first produced in a mold and then covered or lacquered with a top layer of various materials such as textile fabrics, leather, PVC or polyurethane is very labor intensive and expensive. This is especially true if the foam cores have an irregular shape.

The other principle which has also been known for many years, of producing so-called integral foams, as described, for example, in U.S. Pat. No. 3,824,199; 3,726,952; 4,033,912; 4,024,090; 4,058,492 and 4,020,001, has also hitherto been restricted mainly to the use of aromatic polyisocyanates, because of the chemical inertness of aliphatic polyisocyanates. This, of course, cannot result in foams which are resistant to light and yellowing.

The specific examples of foam plastics with a top layer described in U.S. Pat. No. 3,847,720 have the same disadvantage since the polyisocyanates used for producing the top layer in the examples are aromatic polyisocyanates. Replacing the aromatic polyisocyanates in the formulations given in the examples of U.S. Pat. No. 3,847,720 with aliphatic polyisocyanates which react to produce light-fast polyurethanes would have the disadvantage that the systems could not be hardened within the necessary time of from 10 to 20 minutes at room temperature, even in the presence of catalysts.

U.S. Pat. No. 3,475,266 again gives no indication as to how molded foam plastics with light resistant and yellowing resistant top layers could be produced since the polyisocyanates used in this patent are again exclusively aromatic. In spite of the fact that these aromatic polyisocyanates are used, which are more highly reactive than aliphatic polyisocyanates, the process described is complicated by the fact that both the components and the mold have to be heated in order to achieve sufficient hardening.

It was therefore an object of the present invention to provide a simple and commercially practical process for the production of molded foam plastics based on polyisocyanates with a top layer which is resistant to light and yellowing. This problem could be solved by the process according to the invention which is described in more detail below.

DESCRIPTION OF THE INVENTION

This invention relates to a process for the production of molded polyisocyanate-based foam plastics which have a polyurethane-based top layer which is non-cellular and resistant to light and yellowing, by foaming a reaction mixture in a closed mold, the internal walls of which are at least partly coated with the aforesaid top layer or with a reaction mixture which reacts to form the top layer, characterized in that before the mold is filled with the foamable reaction mixture, the internal walls of the mold are at least partly coated with a liquid coating agent which contains a binder and optionally solvents, levelling agents, thickeners, mold release agents, pigments and/or other known auxiliaries of lacquer technology and which reacts to form a light resistant and yellowing resistant top layer based on polyurethane-polyurea, the said binder comprising:

(a) at least one isocyanate prepolymer which contains at least two aliphatically and/or cycloaliphatically bound isocyanate groups and (b) a hardener mixture composed of water and primary polyamines which contain aliphatically and/or cycloaliphatically bound amino groups and which are partly present in an aldimine- or ketimine-blocked form.

The present invention also relates to the molded foam plastics obtainable by this process.

When carrying out the process of the invention, the internal walls of the mold are at least partly coated with a liquid coating agent before the mold is filled. The coating agent should be one which preferably hardens at room temperature within a period of about 1 to 10, preferably 1 to 5, minutes to such a degree that the second step of the process, that is filling of the mold, may be started. This second step is carried out when the coating agent applied to the internal surface of the mold no longer has its original low viscosity (i.e. is no longer freely flowing), but is not yet completely hardened, i.e. it is still tacky. In practice, the mold would be filled at the earliest when the coating agent applied begins to have a so-called "thread drawing" consistency. This means that when a glass rod dipped into the coating compound is removed, a thread is formed on it.

The coating agent to be used according to the invention comprises a binder and optionally the usual auxiliary agents and additives used in lacquer technology.

The binder is a two-component mixture of (a) an isocyanate prepolymer and (b) a hardener, which mixture reacts to form a polyurethane-polyurea.

The isocyanate prepolymers are reaction products of excess quantities of polyisocyanates and polyhydroxyl compounds.

The polyisocyanates used for producing the isocyanate prepolymers may be any polyisocyanates in which the isocyanate groups are not attached to benzoid carbon atoms, i.e. preferably polyisocyanates which have aliphatically and/or cycloaliphatically bound isocyanate groups. Polyisocyanates of this type are preferred. The polyisocyanates used for preparing the isocyanate prepolymers generally have a molecular weight of from 112 to 600. The following are examples of suitable polyisocyanates: 1,2-diisocyanato ethane; tetramethylene diisocyanate; hexamethylene diisocyanate; dodecamethylene diisocyanate; 1,3-diisocyanato cyclobutane; 1,4-diisocyanato cyclohexane; 2,4- and 2,6-diisocyanato perhydrotoluene; 2,4'- and 4,4'-diisocyanato dicyclohexyl methane; 1-isocyanato-3,3,5-trimethyl-5-isocyanato methyl-cyclohexane (isophorone diisocyanate=IPDI) or p-xylylene diisocyanate. Araliphatic diisocyanates are regarded for the purpose of this invention as belonging to the group of aliphatic diisocyanates. Preferred polyisocyanates are: IPDI, 4,4'-diisocyanato dicyclohexyl methane, hexamethylene diisocyanate and any mixtures of these diisocyanates.

The compounds which are reacted with the above mentioned polyisocyanates to prepare the isocyanate prepolymers may be polyhydroxyl compounds containing from 2 to 8, preferably 2 to 4 hydroxyl groups and having a molecular weight of about 300 to 10,000, preferably 800 to 3,000. Suitable polyhydroxyl compounds include the known corresponding polyhydroxy polyesters, polyhydroxy polyethers, polyhydroxy polythioethers, polyhydroxy polyacetals, polyhydroxy polycarbonates, polyester amides and polyhydroxy polyacrylates. Preferred polyhydroxyl compounds are the corresponding polyhydroxy polyesters, polyhydroxy polyethers and polyhydroxy polycarbonates. Such polyhydroxyl compounds have long been known in the art as starting materials for the production of polyurethanes and have been disclosed, for example, in U.S. Pat. No. 4,033,912, column 5, line 14 to column 6, line 56.

Low molecular weight polyols may also be added in quantities of up to 80, preferably up to 50 hydroxyl equivalents percent, based on the total quantity of polyhydroxyl compounds, for preparing the isocyanate prepolymers. These low molecular weight polyols generally have a molecular weight below 300, e.g. ethane diol, butane diol-(1,4) and trimethylol propane. Propane diol-(1,3) and -(1,2), butane diol-(1,3), -(1,4) and -(2,3), pentane diol-(1,5), hexane diol-(1,6), bis-hydroxyethyl-hydroquinone, glycerol and N-methyl-hydroxy ethylamine, for example, may also be used.

Preparation of the isocyanate prepolymers is carried out in known manner by reacting higher molecular weight polyhydroxyl compounds and optionally chain lengthening agents with excess polyisocyanate by any suitable method. A molar NCO/OH ratio of from 1.2:1 to 6:1, preferably 1.6:1 to 3:1 is employed.

The isocyanate prepolymers generally have an isocyanate content of from 1 to 10, preferably from 2 to 5% by weight. By "isocyanate prepolymers" are meant both true prepolymers, i.e. isocyanate prepolymers which are free from monomers, and mixtures thereof with excess monomeric diisocyanates, (such mixtures are obtained when diisocyanates are reacted with diols at an NCO/OH ratio above 2:1). Isocyanate prepolymers which are obtained from such mixtures after removal of the excess monomeric diisocyanate or after thin layer distillation may also be used according to the invention.

The hardener used in the process of the invention comprises a mixture of water with primary polyamines in which all of the amino groups are either aliphatically and/or cycloaliphatically bound and which are partly in their aldimine- or ketimine-blocked form. Araliphatically bound amino groups are to be regarded as aliphatically bound amino groups.

Hardener mixtures are defined above may be obtained, for example, by the reaction of polyamines which contain primary aliphatically and/or cycloaliphatically bound amino groups with aldehydes or ketones in which the water content may be increased by the addition of water to the water of reaction formed by the formation of aldimine or ketimine. Any organic compounds which contain at least two primary aliphatically and/or cycloaliphatically bound amino groups as well as any aldehydes or ketones which are capable of aldimine or ketimine formation with these amines are suitable for production of the hardener mixtures.

The hardener mixtures to be used according to the invention contain both free amino groups and aldimine or ketimine groups as well as water. These mixtures generally contain from 2 to 20, preferably from 2.5 to 6 mols of aldimine or ketimine groups for every mol of free primary amino groups and from 1 to 8, preferably from 1.5 to 4 mol of water to each mol of aldimine or ketimine groups. The concentration in the mixture of compounds which contain groups of the type mentioned above can be determined by gas chromatography.

The preferred hardener mixtures to be used according to the invention are derived from diamines corresponding to the formula:

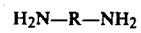
$$H_2N-R-NH_2$$

in which
R represents an aliphatic hydrocarbon group having from 2 to 18 carbon atoms which may be interrupted by ether oxygen bridges or by NH— or NX-bridges ($X=C_1-C_4$-alkyl); a cycloaliphatic hydrocarbon group with 4 to 15 carbon atoms or an araliphatic hydrocarbon group with 8 to 10 carbon atoms, at least 2 carbon atoms being arranged between the two primary amino groups and both primary amino groups being aliphatically or cycloaliphatically bound.

The hardener mixtures to be used according to the invention are prepared by reacting the polyamine component with aldehydes or ketones. The preferred hardener mixtures to be used according to the invention contain reaction products of the above mentioned preferred polyamines with aldehydes or ketones corresponding to the formula

$$O=R_1$$

in which
$R_1$ represents an aliphatically or cycloaliphatically bound hydrocarbon group such as can be obtained by removal of the carbonyl oxygen atom from an aliphatic or cycloaliphatic aldehyde or ketone having from 2 to 8, preferably from 3 to 6 carbon atoms.

The preferred hardener mixtures to be used according to the invention thus contain compounds (A), (B) and (C) having the formulae represented below, in which R and $R_1$ have the meanings already specified.

$$H_2N-R-NH_2 \quad (A)$$

$$H_2N-R-N=R_1 \quad (B)$$

$$R_1=N-R-N=R_1 \quad (C)$$

The preferred hardener mixtures to be used according to the invention contain the aforesaid components A, B, C and water in quantities corresponding to the following molar ratios:

(A/B+C)=1:20 to 1:3, preferably 1:10 to 1:4;

(B/C)=1:2 to 1:6, preferably 1:2 to 1:4; and $$\frac{A+B+C}{H_2O} = 1:1.4 \text{ to } 1:20, \text{ preferably } 1:1.4 \text{ to } 1:10.$$

The amount of the aforesaid individual components present in the hardener mixtures to be used according to the invention can easily be determined by gas chromatography.

For preparing the hardener mixtures to be used according to the invention, all that is necessary is to mix the polyamine component with the aldehyde or ketone component and optionally water and then heat the mixture at about 80° C., preferably at the reflux temperature, until the amount of the individual components present corresponds to the quantitative proportions indicated above. Heating at the reflux temperature for approximately 0.5 to 5 hours is generally sufficient for this purpose.

For preparing the hardener mixtures to be used according to the invention, the aldehydes or ketones are generally used in quantities corresponding to 1 to 5 aldehyde or ketone groups to each primary amino group. An excess of aldehyde and particularly of ketone is often used, which may then serve as solvent for the coating agent.

The water content corresponding to the above ratios in the hardener mixtures to be used according to the invention can be adjusted by the addition of water before and/or after aldimine or ketimine formation. Even when a large excess of water is used, the aldimine and ketimine groups are preserved at room temperature.

Examples of polyamines suitable for preparing the hardener mixtures to be used according to the invention include ethylene diamine, trimethylene diamine, tetramethylene diamine, hexamethylene diamine, propylene diamine, the isomeric mixture of 2,2,4- and 2,4,4-trimethyl-hexamethylene diamine, 1,3- and 1,4-xylylene diamine, bis-(2-aminoethyl)amine and methyl-bis-(3-aminopropyl)-amine.

Cycloaliphatic diamines are preferred. The following compounds are given as examples:

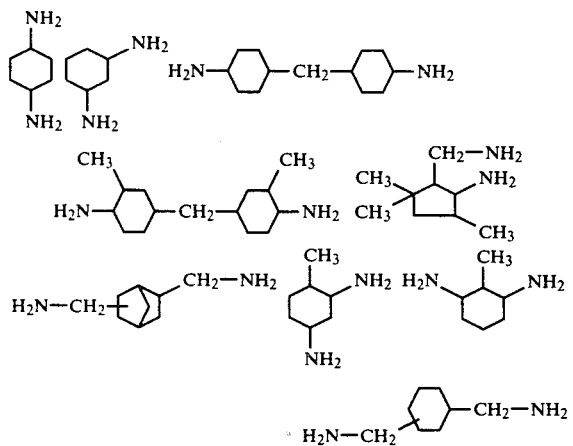

The following is particularly preferred:

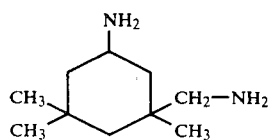

Suitable aldehydes or ketones for preparing the hardener mixtures to be used according to the invention are, for example, butyraldehyde, isobutyraldehyde, acetone, methyl ethyl ketone, diisopropyl ketone, cyclopentanone and cyclohexanone. The above mentioned ketones are preferred.

The coating agents to be used according to the invention preferably contain the isocyanate prepolymer and hardener mixture in quantities which correspond to an $NCO/NH_2$ equivalent ratio, based on the total quantity of free and blocked primary amino groups, of from 0.9:1 to 1.3:1, in particular from 1:1 to 1.1:1. The speed of setting can be controlled by the water content of the hardener mixture, particularly when slight excesses of water are used, so that on the one hand good levelling is obtained but on the other hand there is a sufficiently rapid increase in the viscosity at room temperature so that, for example, coating agents sprayed over vertical walls of the mold do not drip.

It would also be possible to carry out a two stage process by incorporating in the hardener mixture a portion of the isocyanate prepolymer corresponding to an $H_2N/NCO$ equivalent ratio, based on free and blocked primary amino groups, of from 10:1–2:1 to produce a solution of amino functional prepolymer in excess hardener mixture. This solution is then used as hardener for the remaining quantity of isocyanate prepolymer when preparing the top layer. In this variation of the process according to the invention, the quantity of isocyanate prepolymer reacted with the hardener mixture in the first stage is preferably calculated to provide approximately equal quantities by volume of the two reactants for preparing the top layer in the second stage. This facilitates the process of metering in the spray installation and at the same time effects very homogeneous mixing of the reactants.

The coating agents to be used according to the invention may contain the usual auxiliary agents and additives used in lacquer technology. In particular, levelling agents, thickeners, mold-release agents, pigments and solvents in addition to the binders consisting of components (a) and (b) may be used. The binder content in the coating agents to be used according to the invention is generally from 40 to 80, preferably from 45 to 65% by weight. The process is preferably carried out with only a small quantity of solvent, that is to say the proportion of solvent in the coating agent is preferably less than 50% by weight, most preferably less than 40% by weight. When solvent is used in the hardener mixture, it is often for the purpose of facilitating metering. The following are examples of solvents which may be used both for the isocyanate prepolymer and for the hardener mixture: hydrocarbons such as toluene or xylene, which may be in halogenated form, or chlorobenzene; esters such as ethyl glycol acetate or ethyl acetate; ketones such as acetone, methyl ethyl ketone, methyl isobutyl ketone or cyclohexanone. Other commonly used solvents such as dimethyl formamide may also be used.

Non-toxic solvents with a low polarity, however, are preferred according to the invention. Alcohols may also be used as solvents for the hardener mixture, e.g. isopropanol, isobutanol, ethanol or ethylene glycol monomethyl ether.

When carrying out the process according to the invention, the coating agents are used in such quantities that the thickeners of the layer obtained after hardening, i.e. the outer skin of the molded foam plastic product, has a thickness of from 0.1 to 5 mm, preferably from 0.3 to 2 mm.

The coating agents to be used according to the invention are particularly distinguished by the fact that they react sufficiently within a period of from 1 to 10 minutes, preferably from 1 to 5 minutes at room temperature to allow the mold to be filled.

The at least partial coating of the internal walls of the molds may be carried out by any application techniques of the type also known for lacquers, such as spraying, atomization or brush coating. The components (a) and (b) of which the binder is composed are combined shortly before use of the coating agent, as is customary with two-component lacquers. The optional auxiliary agents and additives mentioned above may be added either to the isocyanate component or to the hardener. When the two-component system mentioned above is employed, additives such as pigments are preferably added to the modified hardener, i.e. the mixture of $H_2N$-prepolymer and excess hardener mixture.

The molds used for the process according to the invention may be the usual molds used for the production of molded foam plastics based on polyisocyanates, which may be made of metal or a plastics material and may be lined with an embossed skin, for example of a silicone rubber. The mold should be provided with a closable opening so designed that the whole internal surface of the mold can be sprayed with the coating agent to be used according to the invention, for example by means of a spray gun.

In the context of this invention, the term "polyisocyanate-based foam plastics" is used to mean any foam plastics obtained in known manner by polyaddition reactions (polyurethane foams), polymerization reactions (polyisocyanurate foams) or polycondensation reactions (polycarbodiamide foams) of organic polyisocyanates. It may also be used to denote the known mixtures thereof. The products produced by the process according to the invention are preferably polyurethane foams.

Since the coating of the internal surface of the mold with the coating agent has already ensured the formation of a dense, preferably non-cellular outer skin, it is sufficient to fill the mold with a sufficient quantity of foamable mixture that when left to foam unrestricted it produces a volume of foam equal to the internal volume of the mold. In other words, the process according to the invention need not be carried out under conditions of so-called "overcharging" as is customary in the conventional processes for the production of molded foams with an integral density distribution. However, the process according to the invention may also be carried out under conditions of overcharging of the mold.

The question as to whether the whole internal surface of the mold or only a part thereof should be covered with a top layer depends on the purpose for which the molded product is intended. Where only partial coating of the molded article is required, complete coating of the inner surface of the mold is, of course, unnecessary.

The chemical nature of the foamable mixture is not an essential aspect of the invention. The usual starting materials are used for producing the polyurethane-based foam plastics.

Examples of suitable polyisocyanates may be found, for example, in U.S. Pat. No. 4,033,912, from column 3, line 50 to column 4, line 64. Examples of suitable polyhydroxyl compounds may be found in the same patent, in column 4, line 65 to column 6, line 56. Examples of suitable auxiliary agents such as stabilizers, blowing agents, catalysts and the like are also mentioned in the patent.

The foamable reaction mixture may result in a flexible, semi-rigid or rigid polyurethane foam. The rigidity of the foam is adjusted in known manner by suitable choice of the starting materials.

The foams may be produced from aromatic polyisocyanates in combination with polyether polyols and yet still produce molded foam products which are resistant to light and yellowing in spite of the use of aromatic polyisocyanates.

The process according to the invention generally allows light resistant and yellowing resistant molded foams to be produced within 10 to 15 minutes. The rate of hardening of the coating agent can easily be controlled by the quantity of water in the hardener, as already explained above.

The following examples serve to explain the process of the invention in more detail.

The isocyanate prepolymers described below are used in the examples which follow:

Prepolymer A 444 g of 1-isocyanato-3-isocyanatomethyl-3,5,5-trimethyl cyclohexane (isophorone diisocyanate) are introduced into the reaction vessel. 9 g of butane diol-(1,4), 9 g of trimethylol propane and 1600 g of a hydroxyl polyester of adipic acid, ethylene glycol, diethylene glycol and butane diol-(1,4) having a hydroxyl number of 56 and a molecular weight of 2,000 are added one after the other at room temperature with stirring. Heating is continued to maintain the reaction mixture at 110° C. for about 1 hour (until the isocyanate value is constant). After cooling to 65° C., the reaction mixture is diluted with 412 g of methyl ethyl ketone and 206 g of toluene, corresponding to a 77% solution.

The prepolymer solution has a viscosity of 1500 cP at 20° C. and an isocyanate content of 2.95%. The isocyanate equivalent calculated from this is 1425 g.

Prepolymer B 1000 g of hydroxyl polyether based on trimethylol propane and propylene oxide and having a hydroxyl number of 56 and a molecular weight of 3000 and 1000 g of a hydroxyl polyether based on propane diol-(1,2) and propylene oxide and having a hydroxyl number of 56 and a molecular weight of 2000 are added one after another to 555 g of isophorone diisocyanate with stirring. The reaction mixture is heated and the reaction is carried out at 110° to 120° C. (for about 2 to 3 hours) until the isocyanate content is just below the calculated isocyanate content of 4.9%. When cooled, the prepolymer has a viscosity of ca. 3000 cP at 20° C. and an isocyanate content of 4.7%. The isocyanate equivalent calculated from this is 900 g.

Prepolymer C 1000 g of a hydroxyl polycarbonate based on hexane diol-(1,4) and butane diol-(1,4) having a hydroxyl number of 56 and a molecular weight of 2000, 275 g of a hydroxyl polyether based on bisphenol A and propylene oxide and having a hydroxyl number of 200 and a molecular weight of 550 and 22.5 g of butanol-(1,4) are added one after another to 357 g of hexamethylene diisocyanate. The mixture is reacted at 100° to 110° C. for about 2 to 3 hours, until the isocyanate content is just below the calculated content of 4.45%. 385 g of methyl ethyl ketone are added to dilute the reaction mixture to a concentration of 81%. The cooled prepolymer has a viscosity at 20° C. of about 1500 cP and an isocyanate content of 3.58%. The isocyanate equivalent calculated from this is 1170 g.

Prepolymer D 1600 g of a hydroxyl polyether based on trimethylol propane and propylene oxide and having a hydroxyl number of 35 and a molecular weight of 4 800, 550 g of a hydroxyl polyether based on bisphenol A and propylene oxide and having a hydroxyl number of 200 and a molecular weight of 550, 134 g of trimethylol propane and 180 g of butane diol-(1,4) are added one after another to 2000 g of isophorone diisocyanate with stirring.

The mixture is reacted at 110° to 120° C. for about 3 hours, until the isocyanate content is below the calculated content of 8.8%. The reaction mixture is then diluted with 1900 g of methyl ethyl ketone, corresponding to the 70% solution. The cooled prepolymer has a viscosity at 20° C. of about 1000 cP and an isocyanate content of 5.05%. The isocyanate equivalent calculated from this is 830 g.

The hardener mixtures described below are used in the examples which follow:

Hardener 1

A mixture of 255 g of 3,3,5-trimethyl-5-aminomethyl-cyclohexylamine (IPDA), 40 g of water, 200 g of methyl isobutyl ketone (MIBK) and 605 g of methyl ethyl ketone (MEK) is boiled under reflux for 2 hours. The mixture is ready for use as hardener when cooled but it may also be modified, as described in the example of Hardener 4.

Of the 255 g (1.5 mol) of IPDA put into the process, the quantity present in the hardener mixture determined by gas chromatographic analysis is as follows:

(A) 16.5 mol % as free IPDA
(B)
    17.6 mol % as mono-IPDA-MEK-ketimine
    2.8 mol % as mono-IPDA-MIBK-ketimine
(C)
    49.1 mol % as bis-IPDA-MEK-ketimine
    13.5 mol % as bis-IPDA-MEK/MIBK-ketimine
    0.5 mol % as bis-IPDA-MIBK-ketimine.

In addition, the hardener mixture contains a total of 79.5 g (4.4 mol) of water. (The theoretically required quantity of water for hydrolytic decomposition of the ketimine groups to amino groups is 39.5 g).

The molar ratios of the individual hardener components are as follows:

$$\frac{A}{B+C} = \frac{16.5}{20.4 + 63.1} = \frac{1}{5.06}$$

$$\frac{B}{C} = \frac{20.4}{63.1} = \frac{1}{3.04}$$

$$\frac{A+B+C}{H_2O} = \frac{1.5}{4.4} = \frac{1}{2.94}$$

The $NH_2$-equivalent in the hardener mixture here and in the following example is 366 g, based on the free and blocked amino groups.

Hardener 2

A hardener mixture is prepared similarly to Hardener 1 from 255 g of IPDA, 200 g of methyl isobutyl ketone and 645 g of methyl ethyl ketone without additional water. The 255 g (1.5 mol) of IPDA put into the process are calculated according to gas chromatographic analysis to have the following composition in the hardener mixture:

(A) 17.9 mol % as free IPDA
(B)
    15.9 mol % as mono-IPDA-MEK-ketimine
    2.1 mol % as mono-IPDA-MIBK-ketimine
(C)
    49.4 mol % as bis-IPDA-MEK-ketimine
    14.0 mol % as bis-IPDA-MEK/MIBK-ketimine
    0.7 mol % as bis-IPDA-MIBK-ketimine.

In addition, the hardener mixture contains 37.8 g (2.1 mol) of water.

The molar ratios of the individual hardener components therefore have the following values:

$$\frac{A}{B+C} = \frac{17.9}{18.0 + 64.1} = \frac{1}{4.6}$$

$$\frac{B}{C} = \frac{18.0}{64.1} = \frac{1}{3.56}$$

$$\frac{A+B+C}{H_2O} = \frac{1.5}{2.1} = \frac{1}{1.4}$$

The $NH_2$-equivalent of hardener mixture is 366 g.

Hardener 3

A hardener mixture is prepared analogously to Hardener 1 from 174 g (1.5 mol) of hexamethylene diamine (HDA), 876 g of methyl ethyl ketone and 50 g of water. According to gas chromatographic analysis, the 174 g of hexamethylene diamine (HDA) are present in the following forms:

(A) 31.3 mol % as free HDA
(B) 18.3 mol % as mono-HDA-MEK-ketimine
(C) 50.4 mol % as bis-HDA-MEK-ketimine.

In addition, the hardener mixture contains 82 g (4.58 mol) of water.

The molar ratios of the individual hardener components therefore have the following values:

$$\frac{A}{B+C} = \frac{1}{2.2}$$

$$\frac{B}{C} = \frac{1}{2.8}$$

$$\frac{A+B+C}{H_2O} = \frac{1}{3}$$

The $NH_2$-equivalent of hardener mixture is 366 g.

Hardener 4

900 g of prepolymer B having an isocyanate content of 4.7% are added to 1100 g of Hardener 1 at room temperature with stirring. A clear hardener mixture having an amino nitrogen (N) content of 1.4% by weight and an $NH_2$-equivalent of 1000 g is obtained. This mixture is milled together with 300 g of titanium dioxide pigment and is then ready for use. The hardener mixture has a viscosity of about 200 cP and an $NH_2$-equivalent of 1150 g.

Hardener 5

900 g of prepolymer B having an isocyanate content of 4.7% are added to 1100 g of Hardener 3 at room temperature with stirring. The resulting modified hardener mixture now has an amino nitrogen (N) content of 1.4% by weight and an $NH_2$-equivalent of 1000 g. This hardener mixture is milled together with 300 g of a light-green, pulverulent pigment, and is then ready for use. The hardener mixture has a viscosity of about 250 cP and an $NH_2$-equivalent of 1150 g.

Hardener 6

540 g of prepolymer B with an isocyanate content of 4.7% are stirred into 1100 g of Hardener 1 at room temperature. A further 110 g of isopropanol are added to the resulting clear solution. The hardener mixture then obtained is milled together with 250 g of titanium dioxide pigment, and is then ready for use. The hardener mixture has an amine nitrogen (N) content of 1.68% and an $NH_2$-equivalent of 833 g.

EXAMPLES

EXAMPLE 1

A closable metal mold suitable for the manufacture of a motor-bicycle seat is used in this example. Its internal walls are lined with an embossed layer of silicone rubber both to produce an aesthetically pleasing surface and to facilitate subsequent removal of the product from the mold.

The lined internal walls of the mold are then sprayed with a coating agent of Prepolymer A and Hardener 4 in the proportions of their equivalent weights, using a two-component spray apparatus.

The viscosity of the film-forming substance perceptibly increases after a minute. The surface is sprayed three times to build up a top layer with an average thickness of about 0.8 mm. After a total of 4 minutes from the onset of spraying, a foamable reaction mixture is introduced into the mold. This mixture is composed of

- 100 parts by weight of a hydroxyl polyether with a hydroxyl number of 35 and a molecular weight of 4,800 based on trimethylol propane and propylene oxide,
- 12 parts by weight of a hydroxyl polyether with a hydroxyl number 280 and molecular weight 800 based on ethylene diamine and propylene oxide,
- 2 parts by weight of water as blowing agent,
- 5 parts by weight of monofluorotrichloromethane as blowing agent,
- 1 part by weight of tetramethyl guanidine as catalyst,
- 1 part by weight of a polysiloxane-polyethylene oxide block copolymer as foam stabilizer and
- 60 parts by weight of a 4,4-diisocyanato diphenyl methane which has been liquified by reaction with tripropylene glycol in an NCO/OH ratio of 5:1.

The polyol component and the polyisocyanate are fed into a two-component metering and mixing apparatus, vigorously mixed and poured into the mold which has previously been covered with the top layer.

The foamable mixture was used in the quantity which would take up 130% of the volume of the mold if left to foam without restriction. The mixture begins to foam shortly after its introduction into the mold. The finished foamed motor-bike seat can be removed from the mold after about 10 minutes. The top layer has already hardened sufficiently to allow the foamed part to be stacked without risk of damage.

The top layer of the motor-bike seat is subjected to a Xeno test for 400 hours. No yellowing of the white pigmented surface can be detected. The light-resistant top layer has the following mechanical properties:

| Thickness of film | Tensile strength | Elongation at break |
|---|---|---|
| 0.45 mm | 100% 50 kp/cm$^2$ | 700% |
| | 300% 85 kp/cm$^2$ | |

Tear propagation resistance 35 kp/cm

EXAMPLE 2

This Example is intended to demonstrate the different speeds of hardening of the top layer according to the water content of the hardener.

366 g of Hardener 1 and 366 g of Hardener 2 are each mixed with 84 g of a triturate of titanium dioxide pigment so that both hardeners have an $NH_2$-equivalent of 450 g. These hardeners are then worked up with isocyanate prepolymer A in the proportions of their equivalent weights as in Example 1. The formulation of the foam is the same as in Example 1.

Those foamed parts which have been manufactured with Hardener 1, which has a high water content, can be removed from the mold without damage after only 7 to 8 minutes. The top layer which has been produced with the low-water Hardener 2 takes 15 to 30 minutes to harden so that the foamed part can only be removed from the mold after this time.

The surfaces of these two motor-bike seats show no signs of yellowing after a Xeno test of 400 hours.

EXAMPLE 3

A metal mold suitable for the manufacture of an automobile seat is lined with a thin foil of silicone rubber. The lined internal walls of the mold are then sprayed with a coating agent which has been prepared by mixing Prepolymer C with Hardener 5 in proportions by weight of 1:1 by means of a two-component spray installation. The thickness of the layer is ca. 1 mm. The foamable reaction mixture from Example 1 is introduced into the mold ca. 2 minutes after termination of the coating process. The foamable mixture is used in a quantity which, when left to foam without restriction, would take up about 130% of the internal volume of the mold. The automobile seat can be removed without damage 10 to 15 minutes after the top layer has been sprayed into the mold. The light-green surface shows no signs of yellowing after a Xeno test of 400 hours.

EXAMPLE 4

In contrast to the previous Examples, in which the foamed parts had a hardness in the region of Shore A 60, this Example illustrates the manufacture of a very rigid foamed part (Shore Hardness D 60) with a light-fast top layer.

Isocyanate prepolymer D and Hardener 6 as components for the light-fast top layer (mixed in proportions of 1:1) are sprayed into a window frame mold with the apparatus mentioned in Example 1, (thickness of layer: 1.5 mm). A mixture of the following composition for producing the rigid mold is introduced after about 2 minutes:

- 60 parts by weight of a hydroxyl polyether with a hydroxyl number of 830 and molecular weight 200 based on trimethylol propane and propylene oxide,
- 40 parts by weight of a hydroxyl polyether with a hydroxyl number of 42 and molecular weight 4,000 based on trimethylol propane and a propylene oxide-ethylene oxide mixture, 1 part by weight of a polysiloxane-polyethylene oxide block copolymer as foam stabilizer, 0.7 parts by weight of tetramethylene guanidine as catalyst, 12 parts by weight of monofluoro trichloromethane as blowing agent and 134 parts by weight of a liquid polyisocyanate mixture of the diphenyl methane series with an isocyanate content of 32% by weight prepared by the phosgenation of an aniline/formaldehyde condensate.

The foamed window frame can be removed from the mold after about 12 to 15 minutes. It has an overall gross density of about 0.6 g/cm$^3$ and after one day's storage it has a Shore Hardness D of 60. It withstands the 400 hours Xeno test without yellowing.

What is claimed is:

1. A process for the production of molded polyisocyanate-based foam products having a compact, light- and yellowing-resistant polyurethane-based top layer comprising the steps of:
    A. coating a mold with a liquid coating agent, containing a binder, which reacts to form a light- and yellowing-resistant top layer and
    B. introducing a foamable reaction mixture into said mold,
wherein said binder comprises:
    (i) at least one isocyanate prepolymer having at least two exclusively aliphatically and/or cycloaliphatically bound isocyanate groups and
    (ii) a hardener mixture prepared by heating primary polyamines, which have aliphatically and/or cycloaliphatically-bound amino groups with ketones either in the presence of water or with subsequent addition of water and which hardener mixture comprises water and primary polyamines, at least partly in ketimine-blocked form, which have aliphatically and/or cycloaliphatically bound amino groups.

2. The process of claim 1, wherein said foamable reaction mixture reacts to produce a polyurethane foam.

3. The process of claim 1, wherein said foamable reaction mixture is introduced into said mold before said agent has completely reacted.

4. The process of claim 1, wherein said isocyanate prepolymers have an isocyanate content of from 1 to 10% by weight.

5. The process of claim 4, wherein said isocyanate content is 2 to 5% by weight.

6. The process of claim 1, wherein said hardener mixture is selected from the group consisting of (a) $H_2H—R—NH_2$, (b) $H_2N—R—N=R_1$, (c) $R_1=N—R—N=R_1$, or mixture thereof, wherein R represents an aliphatic hydrocarbon group having from 2 to 18 carbon atoms which may be interrupted by either oxygen, NH— or NX— bridges (wherein $X=C_1-C_4$-alkyl); a cycloaliphatic hydrocarbon group with 4 to 15 carbon atoms or an araliphatic hydrocarbon group with 8 to 10 carbon atoms, at least 2 carbon atoms being arranged between the two primary amino groups and both primary amino groups being aliphatically or cycloaliphatically bound; and $R_1$ represents an aliphatically or cycloaliphatically bound hydrocarbon group such as can be obtained by removal of the carbonyl oxygen atom from an aliphatic or cycloaliphatic aldehyde or ketone having from 2 to 8, preferably from 3 to 6 carbon atoms.

7. The process of claim 6, wherein said hardener mixture is a mixture of components (a), (b) and (c) used in the following molar ratio:

$$\frac{a}{b+c} = 1:20 \text{ to } 1:3.$$

8. The process of claim 7, wherein said molar ratio is from 1:10 to 1:4.

9. The process of claim 6, wherein said hardener mixture is a mixture of components (b) and (c) used in the following molar ratio: $(b/c)=1:2$ to $1:6$.

10. The process of claim 9, wherein said molar ratio is from 1:2 to 1:4.

11. The process of claim 6, wherein said hardener mixture is a mixture of components (a), (b), and (c) used in the following molar ratio:

$$\frac{a+b+c}{H_2O} = 1:1.4 \text{ to } 1:20.$$

12. The process of claim 11, wherein said molar ratio is from 1:1.4 to 1:10.

13. The product of claim 1.

* * * * *